Patented July 17, 1923.

1,462,381

UNITED STATES PATENT OFFICE.

ALBERT SCHMIDT, OF PARIS, FRANCE.

WATERPROOFING COMPOSITION.

No Drawing. Application filed October 31, 1922. Serial No. 598,199.

*To all whom it may concern:*

Be it known that I, Dr. ALBERT SCHMIDT, a citizen of France, and a resident of Paris, France, have invented certain new and useful Improvements in Waterproofing Compositions; and I do hereby declare the following to be a full, clear, and exact description of the invention, such as will enable others skilled in the art to which it appertains to make and use the same.

In order to enable wood to withstand the action of moisture, it is necessary to employ a substance which provides a sufficient coating for the surface and also penetrates to a slight extent into the wood. I have ascertained that Montan wax, especially when treated with chlorine, will refuse to take up water, and this to a very marked degree. The penetration of water is also effected only with the greatest difficulty.

The Montan wax treated with chlorine can be used in combination with suitable solvents, and obviously as a constituent of surface coatings which also contain rapid drying oils, siccatives and resins. When used with solvents alone, the chlorinated Montan wax can be well employed as a coating for usual objects or material such as planking, flooring, furniture and the like. Dead varnish of all kinds, which dries immediately on application, can also be prepared by mixing it with suitable coloring matter. By reason of its qualities, the chlorinated Montan wax can be used for the manufacture of shoe blacking which is waterproof and can readily be given a high polish.

*Example 1.*

To produce a shoe blacking of waterproof character and affording a high polish, the following ingredients are mixed in a digester:

450 grammes chlorinated mineral wax.
450 grammes paraffin.
100 grammes ceresine.
1000 grammes turpentine or solvent naphtha.
300 grammes lampblack.

Heat to about 60° C., stirring the mixture till completely dissolved, and then put the same into boxes.

*Example 2.*

To obtain a dead varnish for wood, dissolve in the cold or on the water bath:

1 part of chlorinated Montan wax.
1.5 parts turpentine.

What I claim is:

A waterproofing composition comprising chlorinated mineral wax and turpentine as a solvent thereof.

In testimony that I claim the foregoing as my invention, I have signed my name hereto.

DR. ALBERT SCHMIDT.